US012565457B2

(12) United States Patent
Uchida et al.

(10) Patent No.: US 12,565,457 B2
(45) Date of Patent: Mar. 3, 2026

(54) METHOD FOR MANUFACTURING FERTILIZER

(71) Applicant: SHOWA DENKO K.K., Tokyo (JP)

(72) Inventors: Hiroshi Uchida, Tokyo (JP); Ichiro Fujita, Tokyo (JP); Naoyuki Sugawara, Tokyo (JP); Makoto Saito, Tokyo (JP)

(73) Assignee: Resonac Corporation, Tokyo (JP)

( * ) Notice: Subject to any disclaimer, the term of this patent is extended or adjusted under 35 U.S.C. 154(b) by 775 days.

(21) Appl. No.: 17/917,743

(22) PCT Filed: Mar. 31, 2021

(86) PCT No.: PCT/JP2021/013942
§ 371 (c)(1),
(2) Date: Oct. 7, 2022

(87) PCT Pub. No.: WO2021/205960
PCT Pub. Date: Oct. 14, 2021

(65) Prior Publication Data
US 2023/0159402 A1 May 25, 2023

(30) Foreign Application Priority Data
Apr. 9, 2020 (JP) ................................. 2020-070581

(51) Int. Cl.
| | |
|---|---|
| *C05B 11/10* | (2006.01) |
| *C05F 11/00* | (2006.01) |
| *C05G 1/00* | (2006.01) |
| *C05G 3/00* | (2020.01) |
| *C08B 15/00* | (2006.01) |
| *C08B 37/08* | (2006.01) |

(52) U.S. Cl.
CPC ............. *C05B 11/10* (2013.01); *C05F 11/00* (2013.01); *C05G 1/00* (2013.01); *C05G 3/00* (2013.01); *C08B 15/00* (2013.01); *C08B 37/003* (2013.01)

(58) Field of Classification Search
CPC .. C05B 11/10; C05G 1/00; C05G 3/00; C05F 11/00; C08B 37/003; C08B 15/00
See application file for complete search history.

(56) References Cited

U.S. PATENT DOCUMENTS

| | | | | |
|---|---|---|---|---|
| 3,873,728 A | * | 3/1975 | Moore .................... | A23K 10/37 |
| | | | | 426/624 |
| 3,878,304 A | * | 4/1975 | Moore .................... | A23K 50/15 |
| | | | | 71/25 |
| 5,486,068 A | | 1/1996 | Wilson | |
| 9,133,278 B2 | * | 9/2015 | Slupska .................. | C08B 15/00 |
| 2012/0260706 A1 | * | 10/2012 | Vyrodov ................. | C05F 11/00 |
| | | | | 127/29 |
| 2012/0301948 A1 | * | 11/2012 | Brennan ............. | C08B 37/0057 |
| | | | | 435/243 |
| 2017/0081253 A1 | | 3/2017 | Connell et al. | |

FOREIGN PATENT DOCUMENTS

| | | | | | |
|---|---|---|---|---|---|
| CN | 1445200 A | * | 10/2003 | ............. | C05F 11/00 |
| JP | 49-69448 A | | 7/1974 | | |
| JP | 57-53801 B2 | | 11/1982 | | |
| JP | 63-215606 A | | 9/1988 | | |
| JP | 09-143013 A | | 6/1997 | | |
| JP | 9-508566 A | | 9/1997 | | |
| JP | 2000-109386 A | | 4/2000 | | |
| JP | 2005-281648 A | | 10/2005 | | |
| JP | 2014-68627 A | | 4/2014 | | |
| JP | 2017-197468 A | | 11/2017 | | |
| RU | 2018 143 330 A | | 6/2020 | | |
| RU | 2745715 C2 | * | 3/2021 | ............. | C05B 11/00 |
| WO | 2015/179987 A1 | | 12/2015 | | |
| WO | 2017/187672 A1 | | 11/2017 | | |

OTHER PUBLICATIONS

James Kong-Win Chang, et al., "Two-Step Thermochemical Cellulose Hydrolysis With Partial Neutralization for Glucose Production", Frontiers in Chemistry, Apr. 2018, vol. 6, Article 117, pp. 1-11 (11 pages total).

* cited by examiner

*Primary Examiner* — Wayne A Langel
(74) *Attorney, Agent, or Firm* — Sughrue Mion, PLLC

(57) ABSTRACT

The present invention provides a method for efficiently obtaining a fertilizer containing polysaccharide hydrolysates and nutrients such as calcium, phosphoric acid, and nitrogen. The present invention is a method for manufacturing a fertilizer, characterized by comprising: a hydrolysis step for obtaining a mixture including polysaccharide hydrolysates through hydrolysis of polysaccharides using an acid catalyst; and a neutralizing step after the hydrolysis step for adding at least one basic compound selected from the group consisting of potassium salt, phosphate, ammonium salt, and ammonia.

14 Claims, No Drawings

METHOD FOR MANUFACTURING FERTILIZER

This application is a National Stage of International Application No. PCT/JP2021/013942 filed Mar. 31, 2021, claiming priority based on Japanese Patent Application No. 2020-070581 filed Apr. 9, 2020.

FIELD

The present invention relates to a method for producing a fertilizer containing a polysaccharide hydrolysate.

BACKGROUND

In recent years, in the field of agriculture, it has been reported that xylooligosaccharides, cellooligosaccharides and other oligosaccharides can be used to promote plant growth, as described in Patent Literature 1 below. Furthermore, Patent Literature 2 reports that the phytoalexin-inducing activity (elicitor activity) of chitin oligosaccharides and the antibacterial activity of at least one selected from chitosan, chitosan oligosaccharides, and salts thereof against pathogens of plants can act synergistically to bring about an excellent disease resistance-imparting effect and growth-promoting effect, and the use of hydrolysates of polysaccharides, such as these oligosaccharides, as a plant growth promoter is highly useful.

As methods for synthesizing these polysaccharide hydrolysates, Patent Literature 3 discloses the hydrolysis of chitin with a hydrochloric acid catalyst. However, in order to separate the hydrochloric acid, neutralization thereof with alkali followed by ion exchange membrane electrodialysis for desalting by-product salt is required. Patent Literature 4 discloses a method of hydrolyzing cellulose with concentrated hydrochloric acid or concentrated sulfuric acid. However, this is a treatment as a pre-stage of decomposition with an enzyme, and the separation of the acid and a hydrolysate is not described.

Patent Literature 5 and 6 disclose the hydrolysis of chitin using a ball mill in the presence of an acid catalyst, such as sulfuric acid, nitric acid, hydrochloric acid, perchloric acid, phosphoric acid, nitrous acid, or an organic acid. Though this is an excellent method for hydrolysis, a method for separating the acid and the polysaccharide hydrolysate is not disclosed.

CITATION LIST

Patent Literature

[PTL 1] JP S63-215606 A
[PTL 2] JP H09-143013 A
[PTL 3] JP 2005-281648 A
[PTL 4] JP S57-53801 B2
[PTL 5] JP 2017-197468 A
[PTL 6] WO 2017/187672

SUMMARY

Technical Problem

Though there are methods for hydrolyzing sugars using an enzyme or the like, such methods are costly, and a polysaccharide hydrolysate cannot always be obtained at a sufficient yield.

Though polysaccharide hydrolysates can be produced via hydrolysis using protonic acid as a catalyst, the hydrolysis rate is slow unless an acid having a relatively high acid strength, such as sulfuric acid, hydrochloric acid, or phosphoric acid, is used. In the state where such a strong acid is present in the polysaccharide hydrolysate, there is risk of adverse effects on plants. Furthermore, in the state where such a strong acid is present in the polysaccharide hydrolysate, unexpected side reactions may occur when mixed with other fertilizers or agrochemicals, or precipitation may occur when the pH changes from acidic to neutral. Thus, it is necessary to separate the acid. However, separation from the acid requires use of a special method, such as ion exchange membrane electrodialysis, and industrial production at a low cost is difficult.

The present invention provides a method for efficiently obtaining a fertilizer containing a polysaccharide hydrolysate and a nutrient, such as potassium, phosphoric acid, or nitrogen.

Solution to Problem

The present invention has been achieved in light of the circumstances described above. Based on an idea completely different from the prior art, the present inventors have investigated the use of a basic compound containing potassium, phosphoric acid, nitrogen, or the like, which can be a nutrient necessary for plants, as a neutralizing agent for an acid catalyst and the use of the obtained polysaccharide hydrolysate and a neutralized salt as-is as a fertilizer.

As a result, the present inventors have discovered a method in which a polysaccharide is hydrolyzed using an acid catalyst and then neutralized by adding at least one basic compound selected from the group consisting of potassium salts, phosphates, ammonium salts, and ammonia.

Specifically, the present invention encompasses embodiments [1] to [14] below.

[1] A method for producing a fertilizer, comprising a hydrolysis step wherein a mixture containing a polysaccharide hydrolysate is obtained by hydrolyzing a polysaccharide with an acid catalyst, and a neutralization step wherein, after the hydrolysis step, at least one basic compound selected from the group consisting of potassium salts, phosphates, ammonium salts, and ammonia is added.

[2] The method for producing a fertilizer according to [1], comprising a pH adjustment step wherein pH is adjusted to between 4 and 10 after the neutralization step.

[3] The method for producing a fertilizer according to [1] or [2], comprising a filtration step wherein solid content is separated by filtration after the neutralization step.

[4] The method for producing a fertilizer according to any one of [1] to [3], wherein the basic compound is at least one selected from the group consisting of potassium hydroxide, potassium carbonate, and potassium hydrogen carbonate.

[5] The method for producing a fertilizer according to any one of [1] to [3], wherein the basic compound is at least one selected from the group consisting of dipotassium monohydrogen phosphate, tripotassium phosphate, and diammonium hydrogen phosphate.

[6] The method for producing a fertilizer according to any one of [1] to [5], wherein the acid catalyst is at least one acid selected from the group consisting of sulfuric acid, sulfurous acid, hydrochloric acid, perchloric acid, nitric acid, nitrous acid, and phosphoric acid, or a partially neutralized salt thereof.

[7] The method for producing a fertilizer according to [6], wherein the acid catalyst is phosphoric acid or a partially neutralized salt thereof.

[8] The method for producing a fertilizer according to [7], wherein the acid catalyst is phosphoric acid.

[9] The method for producing a fertilizer according to [7] or [8], comprising an extraction step wherein, after the hydrolysis step, water is added to the mixture and water-soluble components are extracted.

[10] The method for producing a fertilizer according to any one of [1] to [9], wherein the hydrolysis step is performed by a mechanochemical method.

[11] The method for producing a fertilizer according to [10], wherein the mechanochemical method comprises a pulverization process with a planetary ball mill or a vibration mill.

[12] The method for producing a fertilizer according to [10] or [11], wherein a water content in the hydrolysis step is 0.1 to 10 parts by mass relative to 100 parts by mass of the polysaccharide.

[13] The method for producing a fertilizer according to any one of [1] to [12], wherein the polysaccharide contains at least one selected from chitin and cellulose.

[14] The method for producing a fertilizer according to [13], wherein the polysaccharide contains both chitin and cellulose.

Advantageous Effects of Invention

The method for producing a fertilizer of the present invention comprises a hydrolysis step wherein a mixture containing a polysaccharide hydrolysate is obtained by hydrolyzing a polysaccharide with an acid catalyst, and a neutralization step wherein, after the hydrolysis step, at least one basic compound selected from the group consisting of potassium salts, phosphates, ammonium salts, and ammonia is added, whereby a fertilizer containing a polysaccharide hydrolysate and a nutrient, such as potassium, phosphoric acid, or nitrogen, can efficiently be produced.

DESCRIPTION OF EMBODIMENTS

The embodiments of the present invention will be described below. Note that the embodiments described below merely demonstrate typical examples of the present invention, and the present invention is not limited thereto.

The method for producing a fertilizer according to an embodiment comprises a hydrolysis step wherein a mixture containing a polysaccharide hydrolysate is obtained by hydrolyzing a polysaccharide with an acid catalyst, and a neutralization step wherein, after the hydrolysis step, at least one basic compound selected from the group consisting of potassium salts, phosphates, ammonium salts, and ammonia is added.

Hydrolysis Step

The hydrolysis step is a step wherein a polysaccharide is hydrolyzed with an acid catalyst to obtain a mixture containing a polysaccharide hydrolysate.

Polysaccharide

The polysaccharide is not particularly limited as long as it is a polysaccharide which can be hydrolyzed with an acid, and may be, for example, cellulose, xylan, xyloglucan, glucomannan, or chitin. The polysaccharide preferably contains at least one selected from chitin, xylan, and cellulose, and more preferably contains at least one selected from chitin and cellulose. As the polysaccharide, one may be used alone, or two or more types may be used in combination. When two or more polysaccharides are combined, the polysaccharides preferably contain both chitin and cellulose.

Cellulose and xylan are known as biomass and are not fossil resources but rather are plant-derived organic resources.

Examples of cellulose-based biomass include wood-based materials, such as cotton, wood pulp, kenaf, hemp, small-diameter wood, thinned wood, sawdust, wood chips, defatted wood powder, used paper, newspaper, wrapping paper, tissue paper, toilet paper, and cardboard; and herbaceous biomass, such as bagasse, switchgrass, elephant grass, corn core, rice straw, and wheat straw. These can be used alone or in combination of two or more thereof. For example, water-insoluble cellulose obtained via an alkali treatment to remove hemicellulose from chemical pulp (holocellulose) obtained by bleaching degreased wood powder with chlorination can be used. The cellulose-based biomass may contain xylan in addition to cellulose.

In general, cellulose exhibits crystallinity when two or more cellulose molecules are bonded by hydrogen bonds. In an embodiment, cellulose having such crystallinity can also be used as a raw material. In this embodiment, a treatment to reduce crystallinity, such as pre-disintegration, is preferably performed before use to lower the crystallinity in order to increase the hydrolysis rate. The cellulose having reduced crystallinity may be one having partially reduced crystallinity or one having completely or substantially completely eliminated crystallinity. Though the method of the crystallinity reduction treatment is not particularly limited, it is preferable that the crystallinity reduction treatment be capable of cleaving the hydrogen bonds to at least partially generate single-stranded cellulose molecules. By using cellulose at least partially containing single-stranded cellulose molecules as a raw material, the efficiency of hydrolysis can be significantly improved.

Examples of the treatment for reducing the crystallinity of the cellulose serving as a raw material include, as pre-disintegration, a method, such as a ball mill method, in which the hydrogen bonds between the cellulose molecules are physically cleaved to obtain single-stranded cellulose molecules (refer to Zhao et al, Energy & Fuels, 20, 807 (2006)), and a method of chemically cleaving the hydrogen bonds between the cellulose molecules to obtain single-stranded cellulose, such as a phosphoric acid treatment, without applying compressive shear stress (refer to Zhang et al, Biomacromolecules, 7, 644 (2006)). The treatment for reducing the crystallinity of the cellulose may not be a treatment for completely eliminating the crystallinity of the cellulose and may be a treatment for partially reducing the crystallinity of the cellulose before treatment. By using a raw material of a cellulose subjected to such a treatment, the efficiency of hydrolysis can be significantly improved.

Further, as a method for reducing the crystallinity of the cellulose serving as a raw material, for example, pressurized hot water treatment (refer to Hayashi, et al, J. Jpn. Inst. Energy, 83, 805 (2004); Sasaki et al, Ind. Eng. Chem. Res., 39, 2883 (2000); etc.) can be adopted.

Xylan is a polysaccharide with $\beta 1,4$ or $\beta$-1,3 bonds between D-xylose residues. The sugar constituting xylan may contain arabinose, glucuronic acid, 4-O-methylglucuronic acid, glucose, or galactose in addition to xylose.

The xylan-containing raw material is preferably pre-disintegrated by applying compressive shear stress before performing the hydrolysis step. A compression shear type disintegrator can be used to apply compressive shear stress to the xylan-containing raw material for disintegration. Compression shear type disintegrators are machines which are capable of applying both compressive stress and shear stress, and examples thereof include a vibrating rod mill and a vibrating ball mill. Among these, a vibrating rod mill is preferable from the viewpoint of production efficiency. Though the rods are not particularly limited, the outer diameter thereof is preferably 0.1 to 100 mm, and more preferably 0.5 to 50 mm. Though the filling rate of the rods (the apparent volume of the rods with respect to the volume of the stirring part of the vibration mill) differs depending on the model, it is preferably 10 to 97%, and more preferably 15 to 95%.

The disintegration conditions, such as the disintegration time and the rotation speed of the disintegrator, may be appropriately set in order to for the desired disintegrated product. From the viewpoint of obtaining a high hydrolysis rate, it is preferable that the crystallinity of the xylan-containing disintegrated product be low.

The xylan-containing raw material may be coarsely pulverized in advance before being disintegrated by applying compressive shear stress. The method of coarse pulverization is not particularly limited, and for example, a cutting pulverizer, such as a grinder/roll cutter, an impact type pulverizer, such as a hammer mill, or a grinding type pulverizer, such as a colloid mill, can be used as the pulverizer.

Chitin is a substance which is contained in biomass, such as the shells or epidermis of crustaceans, such as shrimp and crab, arthropods, insects, squids, shellfish, krill, or the like, and the cell walls of fungi, such as mushrooms.

Though the chitin may be a refined product or an unrefined product, it is preferably a refined product. For example, in the case of crab shells, refined chitin can be obtained by subjecting the crab shells to treatments, such as dissolution of protein with an alkali and dissolution of calcium with an acid, followed by treatments, such as neutralization, solid-liquid separation, and washing with water. As the refined chitin, industrially prepared chitin is easily available. In the case of an unrefined product, it can be used as long as substances which interfere with the hydrolysis of chitin are removed from the chitin obtained from the natural world.

The chitin may be dry or wet, and may be crystalline or amorphous. The chitin is preferably pre-disintegrated prior to the hydrolysis step. Pre-disintegration increases contact with the acid catalyst and promotes decomposition. Thus, it is preferable that the shape and size of chitin used for pre-disintegration be suitable for disintegration. Examples of such a shape and size include a powder having a particle size of 20 to 1000 μm.

When pre-disintegrating chitin, in the pre-disintegration treatment, for example, a pre-disintegrator, such as a shredder, jaw crusher, gyratory crusher, cone crusher, hammer crusher, roll crusher, or roll mill, or an intermediate pulverizer, such as a stamp mill, edge runner, cutting/shear mill, rod mill, autogenous pulverizer, or roll mill, can be used. The time of the pre-disintegration treatment is not particularly limited as long as the treated chitin is uniformly micronized. Further, in order to obtain a high hydrolysis rate, it is preferable that the degree of crystallinity of the chitin be low.

[Acid Catalyst]

As the acid catalyst used for hydrolysis of polysaccharides, for example, the conventionally known acids described in Patent Literature 3 to 6 can be used. Specifically, at least one selected from the group consisting of sulfuric acid, sulfurous acid, hydrochloric acid, perchloric acid, nitric acid, nitrous acid, and phosphoric acid, or a partially neutralized salt thereof can be used. Examples of the partially neutralized salt of the acid include monopotassium dihydrogen phosphate, monoammonium dihydrogen phosphate, and potassium hydrogen sulfate. The acid catalyst is preferably phosphoric acid or a partially neutralized salt thereof, and more preferably phosphoric acid.

[Hydrolysis Reaction]

In the hydrolysis step, the amount of acid catalyst used depends on the mode of the hydrolysis. For example, when hydrolyzing with hydrochloric acid having a concentration of 30% or more at near room temperature, it is preferable to use a large excess acid of 10 times molar equivalent or more relative to the polysaccharide. When hydrolyzing at 110° C. or lower by a mechanochemical method, the mass ratio of polysaccharide to acid catalyst is preferably polysaccharide/acid catalyst=2 to 100, more preferably, polysaccharide/acid catalyst=4 to 20, and further preferably, polysaccharide/acid catalyst=3 to 10. When the mass ratio of polysaccharide to acid catalyst is 100 or less, hydrolysis proceeds at a practically acceptable rate. When the mass ratio of polysaccharide to acid catalyst is 2 or more, side reactions, such as dehydration reaction and carbon-carbon bond cleavage, can be suppressed during hydrolysis.

As used herein, the mass of the polysaccharide is the true mass of the polysaccharide (dry mass) excluding the water contained in the raw material. Generally, polysaccharides contain physically adsorbed water, and thus the adsorbed water content is analyzed and the mass ratio of the polysaccharide to the acid catalyst is determined by the mass of the polysaccharide excluding the water content. Examples of the method for analyzing the adsorbed water content include a method for quantification in which the raw material polysaccharide is placed in a constant temperature dryer at 100° C. to 150° C. and dried until no mass loss is observed. In order to prevent the influence of side reactions, such as dehydration reactions, during drying, drying at a lower temperature using a vacuum dryer is more desirable for quantification. The mass of the acid catalyst is also the mass of the true acid catalyst (dry mass).

As described above, the polysaccharide prior to hydrolysis already contains approximately 1 to 3% by mass of physically adsorbed water. In addition, water is contained in many acid catalysts, such as hydrochloric acid and phosphoric acid, in conventional commercially available forms. Thus, the hydrolysis of the polysaccharide can be promoted using the water physically adsorbed on the polysaccharide and the water contained in the acid catalyst. Normally, the water content is sufficient without the need to further add water, but for polysaccharides with a high degree of dryness, water can be added for hydrolysis.

Regardless of whether water is added or not, the polysaccharide contains approximately 1 to 3% by mass of physically adsorbed water. Thus, in the hydrolysis step, the water content including the water physically adsorbed on the polysaccharide, the water contained in the acid catalyst, and the added water, if any, is preferably 0.1 parts by mass to 10 parts by mass, and more preferably 0.5 parts by mass to 8 parts by mass, relative to 100 parts by mass of the true mass (dry mass) of the polysaccharide. When the water content is 10 parts by mass or less, a sufficient hydrolysis rate can be obtained, and inoperability due to sticking to the device or the like can be prevented. Further, when the water content is 0.1 parts by mass or more, side reactions, such as dehydration reactions or branching reactions, of the polysaccharide can be suppressed.

The method of hydrolysis is not particularly limited, and examples thereof include a method of hydrolyzing at a reaction temperature of 5° C. to 30° C. using hydrochloric acid having a concentration of 30% or more, a method of hydrolyzing in a subcritical state (150 to 350° C., 0.5 to 25 MPa) using a catalytic amount of sulfuric acid and water in an amount of 10 times by mass or more relative to the polysaccharide, and a mechanochemical method. Among these, a mechanochemical method is preferably used. The mechanochemical method is a method of hydrolyzing a polysaccharide by applying a mechanical external force through a pulverization process. When chitin is used as the polysaccharide, for example, the methods described in Patent Literature 5 and 6 can be used. When cellulose is used as the polysaccharide, for example, the method described in Kuga et al, Cellulose, 26, 215 (2019) can be used.

Examples of the pulverization device used in the pulverization process include rolling ball mills, such as pot mills, tube mills, and conical mills; jet pulverizers, such as swirling flow jet mills, collision type jet mills, fluidized bed type jet mills, and wet type jet mills; shear mills, such as mortar machines (crushers) and Angmills; colloidal mills, such as mortars and stone mortar mills; impact pulverizers, such as hammer mills, cage mills, pin mills, disintegrators, screen mills, turbo mills, and centrifugal classification mills; vibration mills which move a medium therein by vibrating a drum for pulverization; and planetary ball mills, which are a type of pulverizer which employs rotation and revolution movements.

The pulverization device is preferably a ball mill or a vibration mill in which a compressive force is strongly applied to the polysaccharide and tensile stress is applied in both directions of the main chain. The pulverization device is more preferably a planetary ball mill, a rolling ball mill, or a vibration mill, and further preferably a planetary ball mill or a vibration mill.

At the laboratory level, it is preferable to use a planetary ball mill. Industrially, it is preferable to use a vibration mill. Vibration mills do not rotate a drum (crushing cylinder) in which the crushing medium is inserted, but move the medium therein by vibrating the drum, whereby pulverization can be performed in approximately $\frac{1}{10}$ to $\frac{1}{20}$ the time of a rotating drum ball mill, The pulverization process can be performed continuously or intermittently. The pulverization process is preferably performed intermittently in order to suppress a rise in the temperature of the object during the pulverization process. When the pulverization process is performed intermittently, the optimum value differs greatly depending on the pulverization device. For example, in the case of a planetary ball mill, pulverization can be performed by repeating a cycle with an interval of 5 to 15 minutes every time the pulverization process is performed for 5 to 15 minutes. When the pulverization process is performed continuously, it is preferable to perform the pulverization process while maintaining an appropriate temperature by installing a jacket or the like on the pulverization device and cooling the pulverization device.

When hydrolyzing a polysaccharide using a pulverization device such as a ball mill, hydrolysis can be performed while reducing the crystallinity of the polysaccharide by a pulverization process, or can be carried out by adding an acid catalyst after performing the treatment for reducing the crystallinity of the polysaccharide in advance as described above. When the polysaccharide is pre-disintegrated with a Henschel mixer and a pulverization process is then performed with a ball mill or the like, the acid catalyst may be mixed from the pre-disintegration stage.

The temperature of the hydrolysis is preferably ambient temperature to 110° C., and more preferably 50° C. to 100° C. When the temperature is above ambient temperature, the progress of decomposition is not reduced, and the time required for decomposition does not become excessively long. Hydrolysis can also be performed at high temperatures to further increase the decomposition rate. When the temperature of the hydrolysis is 110° C. or lower, side reactions, such as dehydration reactions, can be suppressed. When the temperature of the hydrolysis is higher than 110° C., dehydration reactions are likely to occur and the volatilization of water may be promoted. When hydrolysis is performed by a mechanochemical method, shearing heat is generated. Thus, it is preferable to repeat the cycle with an interval as described above or to control the hydrolysis temperature by flowing cooling water through the jacket of the pulverization device.

The time of hydrolysis is preferably 10 hours to 100 hours, more preferably 15 hours to 70 hours, further preferably 20 hours to 60 hours, and particularly preferably 30 hours to 50 hours. When the time of hydrolysis is 10 hours or more, the decomposition of polysaccharides is promoted. When the time of hydrolysis is 100 hours or less, polysaccharide hydrolysate can be obtained more efficiently. In the case of hydrolyzing by the above-mentioned mechanochemical method, when the pulverization process is performed intermittently, the hydrolysis time means the net pulverization process time excluding intervals.

The progress of the hydrolysis of polysaccharide can be confirmed by collecting a small amount of the object over time and measuring the amount of water-soluble components contained in the collected material.

After the hydrolysis step, a mixture containing polysaccharide hydrolysate is obtained. In addition to polysaccharide hydrolysate, this mixture may contain undecomposed products of the polysaccharide, acid catalyst, etc. In addition to oligosaccharides, the polysaccharide hydrolysate may contain monosaccharides, dehydrated products whose sugar ends have undergone a dehydration reaction, branched products having an $\alpha$-1,6-glycosidic bond generated by a reaction of the hydroxy group at the 6-position with the $\beta$-1,4-glycosidic bond, or other by-products.

The mixture containing the polysaccharide hydrolysate obtained in the hydrolysis step may be used as-is in the neutralization step, or the neutralization step may be performed after performing an extraction step, which is described later. The mixture obtained in the hydrolysis step also contains by-products other than oligosaccharides as the polysaccharide hydrolysate, but these by-products also have sonic plant growth effect or elicitor activity. Thus, it is efficient to use the mixture still containing these by-products in the neutralization step.

<Neutralization Step>

The neutralization step is a step of neutralizing by adding at least one basic compound selected from the group consisting of potassium salts, phosphates, ammonium salts, and ammonia after the hydrolysis step. Since neutralization heat generation is remarkable in the neutralization step in systems in which concentrated hydrochloric acid is excessively used as an acid catalyst in the hydrolysis step, ice may be added instead of water to cool the system while stirring, and the neutralization step and the extraction step, which is described later, may be performed at the same time.

The acid catalyst used in the hydrolysis remains in the mixture containing the polysaccharide hydrolysate obtained by the hydrolysis step described above. Thus, by adding at least one basic compound selected from the group consisting of potassium salts, phosphates, ammonium salts, and ammonia, the acid catalyst can be neutralized, and a fertilizer containing a polysaccharide hydrolysate and a nutrient, such as potassium, phosphoric acid, or nitrogen, can be efficiently produced.

[Basic Compound]

When a potassium salt is used as the basic compound, for example, potassium hydroxide, potassium carbonate, potassium hydrogen carbonate, potassium formate, potassium acetate, potassium ethoxide, monopotassium dihydrogen phosphate, dipotassium monohydrogen phosphate, tripotassium phosphate, or potassium amide can be used. Among these, potassium hydroxide, potassium carbonate, potassium hydrogen carbonate, dipotassium monohydrogen phosphate, and tripotassium phosphate are preferable, and at least one selected from the group consisting of potassium hydroxide, potassium carbonate, and potassium hydrogen carbonate is more preferable. One type of potassium salt may be used alone, or two or more types may be used in combination.

When a phosphate is used as the basic compound, monopotassium dihydrogen phosphate, dipotassium monohydrogen phosphate, tripotassium phosphate, diammonium hydrogen phosphate, or triammonium phosphate can be used. Among these, at least one selected from the group consisting of dipotassium monohydrogen phosphate, tripotassium phosphate, and diammonium hydrogen phosphate is preferable. Thus, the phosphate may also be a potassium salt or an ammonium salt. One type of phosphate may be used alone, or two or more types may be used in combination.

When an ammonium salt is used as the basic compound, tetramethylammonium hydroxide, tetraethylammonium hydroxide, ammonium carbonate, diammonium hydrogen phosphate, triammonium phosphate, ammonium nitrate, or ammonium sulfate can be used. Among these, diammonium hydrogen phosphate and ammonium sulfate are preferable. One type of ammonium salt may be used alone, or two or more types may be used in combination.

When ammonia is used as the basic compound, it is preferable to use ammonia water.

A potassium fertilizer can be produced using by only a potassium salt as the basic compound. A phosphate fertilizer can be produced by using only a phosphate as the basic compound. A nitrogen fertilizer can be produced by using only an ammonium salt or ammonia as the basic compound.

A composite fertilizer can be produced by using a potassium salt, phosphate, ammonium salt, or ammonia together.

The amount of the basic compound added need not necessarily be an equimolar amount with respect to the acid, and may appropriately be set in consideration of use as a fertilizer. Specifically, since the amounts of nitrogen (N)-phosphorus ($P_2O_5$)-potassium ($K_2O$) in a fertilizer are minimum guaranteed values, it is preferable to add amounts equal to or greater than amounts with which such values can be ensured.

In a fertilizer ingredients label, the total amount of nitrogen, the total amount of phosphoric acid, and the total amount of potassium are displayed as percentages. Thus, specifically, the amount of the basic compound added is adjusted so that the total amount of nitrogen, the total amount of phosphoric acid, or the total amount of potassium is 2 to 5% greater than the displayed amount of the component. The definitions of total amount of nitrogen, total amount of phosphoric acid, and total amount of potassium in a fertilizer ingredients label (Ministry of Agriculture, Forestry, and Fisheries, Notification No. 1,163; Aug. 31, 2000) are shown below.

1. Total Amount of Nitrogen

The amount of nitrogen in a test sample is quantified by the Kjeldahl method, and the percentage (%) thereof to the weight of the test sample is defined as the total amount of nitrogen. However, when nitrate-nitrogen is contained, nitrate-nitrogen shall be reduced to ammoniacal nitrogen as a pretreatment.

2. Total Amount of Phosphoric Acid

After incinerating a test sample, it is dissolved in hydrochloric acid, the amount of phosphoric acid ($P_2O_5$) in the solution is quantified by the ammonium vanadomolybdate method, and the percentage (%) thereof to the weight of the test sample is defined as the total amount of phosphoric acid.

3. Total Amount of Potassium

After carbonizing a test sample, it is dissolved in hydrochloric acid, the amount of potassium ($K_2O$) in the solution is quantified by atomic absorption spectroscopy, and the percentage (%) thereof to the weight of the test sample is defined as the total amount of potassium.

Though the components of the fertilizer are controlled by the elemental contents of nitrogen (N), phosphorus (P), and potassium (K), in the case of P and K, the total amount of phosphoric acid and the total amount of potassium are displayed as the fertilizer, respectively, and thus, it is necessary to determine control values in consideration thereof.

[Neutralization Reaction]

The temperature of the neutralization reaction is preferably 0° C. to 50° C., more preferably 5° C. to 40° C., and further preferably 20° C. to 30° C., in order to prevent the polysaccharide hydrolysate from reacting excessively. Though the neutralization reaction itself is fast, since it is necessary to sufficiently diffuse the acid when insoluble matter derived from the raw material polysaccharide is present, the time of the neutralization reaction is preferably 0.1 hour to 10 hours, more preferably 0.5 hour to 5 hours, and further preferably 1 hour to 3 hours. As the device used for the neutralization reaction, no special device is required, and a conventional stirring tank can be used. When hydrochloric acid or sulfuric acid is used as the acid, a stirring tank with a corrosion-resistant lining, such as glass, is desirable.

When the produced fertilizer is used as a fertilizer for soil spraying, the mixture obtained by the hydrolysis step may be used for the neutralization step while containing the solid content. When the neutralization step is performed with the solid content included, the device used in the hydrolysis step (for example, the pulverization device) can be used as-is for the neutralization step, and the mixture containing the polysaccharide hydrolysate and the basic compound can be mixed. Alternatively, after removing the mixture from the device used in the hydrolysis step, a neutralization step may be separately performed with a Henschel mixer to mix the mixture containing the polysaccharide hydrolysate and the basic compound.

When two or more types of polysaccharides are used as the polysaccharide, a hydrolysis step may be performed separately for each polysaccharide, and the obtained hydrolysis products may then be mixed and the neutralization step may be performed. Alternatively, the hydrolysis step may be performed in a state where the two or more types of polysaccharides are mixed from the start to obtain a mixture of a plurality of types of polysaccharide hydrolysates, and the neutralization step may then be performed on the mixture.

[Other Steps]

In addition to the above hydrolysis step and neutralization step, the following steps can be performed as needed.

[Extraction Step]

The method for producing a fertilizer according to an embodiment may comprise an extraction step wherein water-soluble components are extracted by adding water to the mixture containing the polysaccharide hydrolysate obtained in the hydrolysis step (hereinafter, may be referred to simply as "mixture") after the hydrolysis step. In particular, when hydrolysis is performed by a mechanochemical method, because the amount of water used is small, the mixture is in a solid state containing the polysaccharide hydrolysate and it is preferable to perform this extraction step.

The extraction step may be performed after the hydrolysis step and before the neutralization step, or at the same time as the neutralization step. When concentrated hydrochloric acid is used as the acid catalyst in the hydrolysis step, in the neutralization step, it is preferable to add ice and stir while cooling in order to suppress heat generation, whereby the neutralization step and the extraction step can be performed simultaneously.

When used as a liquid fertilizer, the produced fertilizer is difficult to use if undissolved components are contained. In such a case, it is preferable that water be added to the mixture obtained in the hydrolysis step to extract the water-soluble components, filtration or the like be performed as necessary to remove the solid content, and thereafter the neutralization step be performed.

The mass ratio of the amount of water added to the mixture is preferably (water addition amount)/(mixture)=0.5 to 100, more preferably 1 to 20, and further preferably 2 to 10. When the mass ratio of the amount of water added to the mixture is 0.5 or more, the water-soluble components (for example, oligosaccharides) in the polysaccharide hydrolysate can be efficiently dissolved, and when it is 100 or less, the container for dissolution does not become excessively large, which is efficient.

Though the water added to the mixture is not particularly limited, ion-exchanged water or distilled water is generally used. Aside from ion-exchanged water and distilled water, a solution containing a salt or a buffer solution may be used. An organic solvent which is miscible with water can also be added as long as it does not influence the dissolution of the water-soluble components in the polysaccharide hydrolysate.

The water-soluble components and solid components can be separated by a commonly used method for removing solid content from a suspension. For example, filtration may be performed using a filter paper, filter cloth, membrane filter, filter press, or cross-flow filtration, and natural sedimentation or centrifugal sedimentation may also be performed.

In order to obtain an oligosaccharide having relatively high purity as the polysaccharide hydrolysate, after removing the solid content from the mixture, a purification operation, such as adding ethanol to the aqueous solution containing the water-soluble components to reprecipitate the oligosaccharide, dissolving the obtained precipitate in water again, and repeating ethanol reprecipitation, may be performed.

[pH Adjustment Step]

The method for producing a fertilizer according to an embodiment may comprise a pH adjustment step for adjusting the pH between 4 and 10 after the neutralization step. When producing an acidic fertilizer, the fertilizer is adjusted so as to be acidic after being dissolved in water, and when producing an alkaline fertilizer, the fertilizer is adjusted so as to be alkaline after being dissolved in water.

A pH adjuster which is used also as a fertilizer is preferable. Examples of an acidic pH adjuster include potassium dihydrogen phosphate and ammonium sulfate, and examples of an alkaline pH adjuster include tripotassium phosphate, triammonium phosphate, lime and calcium hydroxide.

When used as a liquid fertilizer, in consideration of storage stability or stability when blended with other agricultural materials, it is preferable to adjust the pH to 4 to 10, and more preferably to adjust the pH to 5 to 9. When the pH is 4 or more, problems such as precipitation formation are unlikely to occur when blended with other agricultural materials, and when the pH is 10 or less, the storage stability is suitable.

[Filtration Step]

The method for producing a fertilizer according to an embodiment may comprise a filtration step for separating solid content by filtration after the neutralization step. In the neutralization step, precipitation may occur when the pH moves to the neutral side. Precipitation of precipitates is particularly remarkable when the polysaccharide is chitin. When the produced fertilizer is used as a liquid fertilizer, the presence of precipitates is not preferable, and thus, it is desirable to separate the solid content by filtration.

Separation of the solid content can be performed by a commonly used method for removing solid content from a suspension. For example, filtration may be performed using a filter paper, filter cloth, membrane filter, filter press, or cross-flow filtration, and natural sedimentation or centrifugal sedimentation may also be performed.

When performing this filtration step, the operation of separating (filtration) the water-soluble components and the solid components after extracting the water-soluble components in the extraction step described above can be omitted.

[Step of Adding Other Components]

The method for producing a fertilizer according to an embodiment may further comprise a step of adding other components which are effective as a fertilizer. Examples of the other components include essential elements, such as calcium (Ca), magnesium (Mg), sulfur (S), iron (Fe), manganese (Mn), boron (B), zinc (Zn), nickel (Ni), molybdenum (Mo), copper (Cu), and chlorine (Cl), and useful elements, such as sodium (Na), silicon (Si), selenium (Se), cobalt (Co), aluminum (Al), and vanadium (V), which are elements that support plant growth.

EXAMPLES

The present invention will be more specifically described below based on the Examples, but the present invention is not limited to these Examples.

Filtrate Analysis Method

Polysaccharide Hydrolysate Content Ratio:

Using a Kett moisture meter (A & D Company, Limited, Heat-drying moisture meter ML-50), the value obtained by subtracting the phosphoric acid content determined from the P content and the KOH content determined from the K content from the evaporation residue ratio of the filtrate analyzed at a temperature of 105° C. is defined as the polysaccharide hydrolysate content ratio.

Content of Polysaccharide Hydrolysate:

Using a Kett moisture meter (A & D Company, Limited, Heat-drying moisture meter ML-50), the polysaccharide hydrolysate content ratio is calculated from the evaporation residue ratio of the filtrate analyzed at a temperature of 105° C., and the solid content is determined from that value. The value obtained by subtracting the P content obtained from the phosphoric acid content and the K content obtained from the potassium (K$_2$O) content value from this solid content is defined as the polysaccharide hydrolysate content.

P Content:

In accordance with 4.2.4. a of the fertilizer test method (2019) specified by the Incorporated Administrative Agency, Food and Agricultural Materials Inspection Center, the phosphoric acid (P$_2$O$_5$) content is calculated by dividing the water-soluble phosphoric acid (diphosphorus pentoxide equivalent) concentration measured by ammonium vanadomolybdate absorptiometry by a coefficient of 2.291, and the P content is calculated from that value.

K Content:

In accordance with 4.3.3. d. of the fertilizer test method (2019) specified by the Incorporated Administrative Agency, Food and Agricultural Materials Inspection Center, the potassium (K$_2$O) content is calculated by dividing the water-soluble potassium (potassium oxide equivalent) concentration measured by ICP emission spectroscopy by a coefficient of 1.2046, and the K content is determined from that value.

N Content:

In accordance with 4.1.2. b of the fertilizer test method (2019) specified by the Incorporated Administrative Agency, Food and Agricultural Inspection Technology Center, the ammoniacal nitrogen (N) content is calculated by the formaldehyde method, and the N content is determined from that value.

Example 1

Method for Production of Fertilizer Containing Cellulose Hydrolysate 3.91 kg of Avicel (crystalline fine powder cellulose manufactured by Merck KGaA) (water content 3.1%, dry mass 3.79 kg) was mixed with 0.53 kg of 85% by mass phosphoric acid (special grade reagent manufactured by FUJIFILM Wake Pure Chemical Corporation) using a Henschel mixer (device name: FM20C/I, manufactured by Nippon Coke & Engineering Co., Ltd.). The mixing conditions were a rotation speed of 1400 rpm and an airflow of 0.4 m$^3$/hr. Based on the water contents of the raw material (cellulose) and phosphoric acid, 5.3 parts by mass of water were contained in the mixture with respect to 100 parts by mass of the dried cellulose.

350 g of this mixture was transferred to a vibration mill (device name: MB-1 type, manufactured by Chuo Kakohki Co., Ltd.) and pulverized, whereby a hydrolysis step was performed by a mechanochemical method. The pulverization conditions were a total amplitude of 8 mm and a frequency of 16.2 Hz, and φ¾-inch carbon steel balls were used. The temperature of the cooling water flowing through the jacket was set to 80° C., and hydrolysis was performed for 24 hours.

This pulverized product was separated from the vibration mill and the balls, and 186 g of the pulverized product was transferred to a melting device (2 L beaker). 721 g of ion-exchanged water was added thereto, and the mixture was stirred at 25° C. for 1 hour using a Three-One Motor™. As a result, the water-soluble components were dissolved to obtain an extract of the cellulose hydrolysate.

154.4 g of a 15% by mass potassium hydroxide aqueous solution was added to this extract, and the mixture was stirred at 25° C. for 1 hour using a Three-One Motor™. 42 g of Perlite #31 (manufactured by Showa Chemical Industry Co., Ltd.) was added as a filtration aid, and filtration was performed using a pressure filter (KST-293-20, manufactured by ADVANTECH Toyo Kaisha, Ltd.) to obtain 674 g of a filtrate.

As a result of analyzing the filtrate, the pH was 6.8, the cellulose hydrolysate was 47.8 g, and 1.8 g of P and 6.8 g of K were contained therein. The composition containing the cellulose hydrolysate obtained in this manner can suitably be used as a fertilizer.

Example 2

Method for Production of Fertilizer Containing Chitin Hydrolysate

Purified chitin (manufactured by FUJIFILM Wako Pure Chemical Corporation) was used as a raw material.

3.96 kg of this raw material (water content 3.3%, dry mass 3.83 kg) was mixed with 0.54 kg of 85% by mass phosphoric acid (special grade reagent manufactured by FUJIFILM Wako Pure Chemical Corporation) using a Henschel mixer (device name: FM2C/I, manufactured by Nippon Coke & Engineering Co., Ltd.). The mixing conditions were a rotation speed of 1400 rpm and an airflow of 0.4 m$^3$/hr. Based on the water contents of the raw material (chitin) and phosphoric acid, 5.5 parts by mass of water were contained in the mixture with respect to 100 parts by mass of the dried chitin.

This mixture was transferred to a vibration mill (device name: MB-1 type, manufactured by Chuo Kakohki Co., Ltd,) and pulverized, whereby a hydrolysis step was performed by a mechanochemical method. The pulverization conditions were a total amplitude of 8 mm and a frequency of 16.2 Hz, and φ¾-inch carbon steel balls were used. The temperature of the cooling water flowing through the jacket was set to 80° C., and hydrolysis was performed for 24 hours.

This pulverized product was separated from the vibration mill and the balls, and 101.6 g of the pulverized product was transferred to a melting device (2 L beaker), 431 g of ion-exchanged water was added thereto, and the mixture was stirred at 25° C. for 1 hour using a Three-One Motor™. As a result, the water-soluble components were dissolved to obtain an extract of the chitin hydrolysate.

71.7 g of a 15% by mass potassium hydroxide aqueous solution was added to this extract, and the mixture was stirred at 25° C. for 1 hour using a Three-One Motor™. 24.3 g of Perlite #31 (manufactured by Showa Chemical Industry Co., Ltd,) was added as a filtration aid, and filtration was performed using a pressure filter (KST-293-20, manufactured by ADVANTECH Toyo Kaisha, Ltd.) to obtain 257 g of a filtrate.

As a result of analyzing the filtrate, the pH was 6,8, the chitin hydrolysate was 19.7 g, and 0.61 g of P, 2.2 g of K, and 1.3 g of N were contained therein. The composition containing the chitin hydrolysate obtained in this manner can suitably be used as a fertilizer.

Example 3

Method for Production of Fertilizer Containing Chitin Hydrolysate 11.7 g of 28% by mass ammonia water (manufactured by Tokyo Chemical Industry Co., Ltd.) was added to an extract of chitin hydrolysate obtained by the same processes as Example 2, and the mixture was stirred at 25° C. for 1 hour using a Three-One Motor™. 24.3 g of Perlite #31 (manufactured by Showa Chemical Industry Co., Ltd.) was added as a filtration aid, and filtration was performed using a pressure filter (KST-293-20, manufactured by ADVAN-TECH Toyo Kaisha, Ltd.) to obtain 242 g of a filtrate.

As a result of analyzing the filtrate, the pH was 6.8, the chitin hydrolysate was 19.7 g, and 1.4 g of P and 4.0 g of N were contained therein. The composition containing the chitin hydrolysate obtained in this manner can suitably be used as a fertilizer.

Example 4

Method for Production of Fertilizer Containing Chitin Hydrolysate 5 g of chitin (manufactured by Koyo Chemical Co., Ltd.) (water content: 1.9%, dry mass: 4.91 g) was used as a raw material. This chitin had a degree of deacetylation of 5% or less, and a viscosity of several tens of cps, and was pulverized to 5 mm or less.

5 g of the above raw material was charged into a 200 mL Erlenmeyer flask, dispersed and dissolved in 50 mL of 35% concentrated hydrochloric acid, and a hydrolysis step was performed for 24 hours to hydrolyze while maintaining the reaction temperature at 25° C. by heating with a water bath.

After the hydrolysis step, approximately 300 g of ice was added to each reaction solution to quench the reaction solution, and a neutralization step was performed to neutralize the reaction solution to a pH of 5 to 6 using 48% by mass of KOH. After the neutralization step, decolorization was performed with activated carbon all day and night, and filtration was performed with Cerite to obtain 311 g of a filtrate.

As a result of analyzing the filtrate, the chitin hydrolysate was 2.2 g, and 25 g of K was contained therein. The composition containing the chitin hydrolysate obtained in this manner can suitably be used as a fertilizer.

Example 5

Method for Production of Fertilizer Containing Cellulose Hydrolysate and Chitin Hydrolysate 349 g of an extract of cellulose hydrolysate obtained by the same processes as Example 1 and 103 g of an extract of chitin hydrolysate obtained by the same processes as Example 2 were mixed, 226.1 g of a 15% by mass potassium hydroxide aqueous solution was added thereto, and the mixture was stirred at 25° C. for 1 hour using a Three-One Motor™. 70 g of Perlite #31 (manufactured by Showa Chemical Industry Co., Ltd.) was added as a filtration aid, and filtration was performed using a pressure filter (KST-293-20, manufactured by ADVANTECH Toyo Kaisha, Ltd.) to obtain 935 g of a filtrate.

As a result of analyzing the filtrate, the pH was 6.8, the cellulose hydrolysate was 48.5 g, the chitin hydrolysate was 20.1 g, and 2.5 g of P, 9.3 g of K, and 1.4 g of N were contained therein. The composition containing the cellulose hydrolysate and the chitin hydrolysate obtained in this manner can be suitably used as a fertilizer.

As shown in Examples 1 to 5, by performing a neutralization step wherein at least one basic compound selected from the group consisting of potassium salts, phosphates, ammonium salts, and ammonia is added after hydrolyzing the polysaccharide with an acid catalyst, a fertilizer containing a polysaccharide hydrolysate and a nutrient, such as potassium, phosphoric acid, or nitrogen, can easily be obtained.

Reference Example 1

10 g of purified chitin (manufactured by FUJIFILM Wako Pure Chemical Corporation) was dispersed in 30 mL of water containing 1.2 g of 85% by mass phosphoric acid (special grade reagent manufactured by FUJIFILM Wako Pure Chemical Corporation), and then dried under reduced pressure to obtain a powder, and the powder was placed in an alumina pot having a capacity of 250 mL together with 100 g of alumina balls having a diameter of 5 mm, set in a planetary ball mill (PULVERISETTE 6 manufactured by FRITSCH GmbH), and processed continuously at 500 rpm for 6 hours to obtain a chitin hydrolysate. The starting temperature was room temperature, and the temperature was allowed to rise due to shear heat generation.

Next, a slurry in which the chitin hydrolysate was suspended in water and neutralized with calcium hydroxide was filtered using a 5B filter paper with a Nutsche filter, and the recovered filtrate was freeze-dried to obtain a chitin oligosaccharide powder.

1.0 g of the obtained chitin hydrolysate, 0.011 g of potassium dihydrogen phosphate (first grade manufactured by FUJIFILM Wako Pure Chemical Corporation), and 0.193 g of tripotassium phosphate (first grade manufactured by FUJIFILM Wako Pure Chemical Corporation) (P: 0.031 g, K: 0.11 g in total) were dissolved in 11.5 g of water, whereby a fertilizer solution containing a chitin hydrolysate having a composition substantially identical to that of Example 2 was obtained.

[Tomato Cultivation Test]

The fertilizer solutions prepared in Example 2 and Reference Example 1 were each sterilized with a 0.45 μm filter to prepare a stock solution, and this stock solution was diluted 1000-fold with water and used in the following cultivation test.

After soaking tomato seeds in distilled water for 6 hours, the stratum corneum was removed and the seeds were dried in a ventilated location for 30 minutes. Next, 10 seeds were placed on each culture dish lined with a plurality of absorbent papers, and each culture dish was filled with a 1000-fold diluted fertilizer solution or water and immersed for 6 hours. Thereafter, 3 seeds of the same size were selected from each culture dish, and potted, and each 1000-fold diluted fertilizer solution or water was added thereto every 2 days after starting and 5 times in total, and cultivation was carried out for 11 days. The plant dry weights of germinated seeds were measured and compared. The plant dry weight was measured after the root portion was cut and the remaining upper part was dried at 50° C. for 12 hours in a constant temperature dryer. The results are shown in Table 1.

TABLE 1

| Cultivation Conditions | Plant Dry Weight |
| --- | --- |
| Fertilizer solution of Example 2 | 63 g |
| Fertilizer solution of Reference Example 1 | 61 g |
| Water only | 38 g |

From the results of Table 1, in the case in which the fertilizer solution of Example 2 was used and the case in which the fertilizer solution of Reference Example 1 was used, it was found that the plant dry weights were similar, and the plant dry weights increased as compared with the case where only water was used. From this, the composition containing the chitin hydrolysate obtained by the method of Example 2 is effective as a fertilizer and can be produced more efficiently than by the method of Reference Example 1.

INDUSTRIAL APPLICABILITY

According to the method for producing a fertilizer of the present invention, a fertilizer containing a polysaccharide hydrolysate and a nutrient, such as potassium, phosphoric acid, or nitrogen, can be efficiently produced.

The invention claimed is:

1. A method for producing a fertilizer, comprising:
a hydrolysis step wherein a mixture containing a polysaccharide hydrolysate is obtained by hydrolyzing a polysaccharide with an acid catalyst, and
a neutralization step wherein, after the hydrolysis step, at least one basic compound selected from the group consisting of potassium salts, phosphates, ammonium salts, and ammonia is added,
wherein
the hydrolysis step is performed by a mechanochemical method, and
in the mechanochemical method, one or more pulverization devices selected from the group consisting of rolling ball mills, jet pulverizers, shear mills, colloidal mills, impact pulverizers, vibration mills, and planetary ball mills are used in a pulverization process.

2. The method for producing a fertilizer according to claim 1, wherein the acid catalyst is at least one acid selected from the group consisting of sulfuric acid, sulfurous acid, hydrochloric acid, perchloric acid, nitric acid, nitrous acid, and phosphoric acid, or a partially neutralized salt thereof.

3. The method for producing a fertilizer according to claim 2, wherein the acid catalyst is phosphoric acid or a partially neutralized salt thereof.

4. The method for producing a fertilizer according to claim 3, wherein the acid catalyst is phosphoric acid.

5. The method for producing a fertilizer according to claim 3, comprising an extraction step wherein, after the hydrolysis step, water is added to the mixture and water-soluble components are extracted.

6. The method for producing a fertilizer according to claim 1, wherein the polysaccharide contains at least one selected from chitin and cellulose.

7. The method for producing a fertilizer according to claim 6, wherein the polysaccharide contains both chitin and cellulose.

8. The method for producing a fertilizer according to claim 1, comprising a pH adjustment step wherein pH is adjusted to between 4 and 10 after the neutralization step.

9. The method for producing a fertilizer according to claim 1, comprising a filtration step wherein solid content is separated by filtration after the neutralization step.

10. The method for producing a fertilizer according to claim 1, wherein the basic compound is at least one selected from the group consisting of potassium hydroxide, potassium carbonate, and potassium hydrogen carbonate.

11. The method for producing a fertilizer according to claim 1, wherein the basic compound is at least one selected from the group consisting of dipotassium monohydrogen phosphate, tripotassium phosphate, and diammonium hydrogen phosphate.

12. The method for producing a fertilizer according to claim 1, wherein the mechanochemical method comprises a pulverization process with a planetary ball mill or a vibration mill.

13. The method for producing a fertilizer according to claim 1, wherein a water content in the hydrolysis step is 0.1 to 10 parts by mass relative to 100 parts by mass of the polysaccharide.

14. The method for producing a fertilizer according to claim 1, wherein the time of hydrolysis is 10 hours to 100 hours.

* * * * *